United States Patent
Okamoto (10) Patent No.: US 12,444,437 B2
(45) Date of Patent: Oct. 14, 2025

(54) DISK DEVICE

(71) Applicants: Kabushiki Kaisha Toshiba, Tokyo (JP); Toshiba Electronic Devices & Storage Corporation, Tokyo (JP)

(72) Inventor: Makoto Okamoto, Tokyo (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 57 days.

(21) Appl. No.: 18/590,664

(22) Filed: Feb. 28, 2024

(65) Prior Publication Data
US 2025/0046337 A1 Feb. 6, 2025

(30) Foreign Application Priority Data
Jul. 31, 2023 (JP) .................................. 2023-124356

(51) Int. Cl.
*G11B 5/48* (2006.01)

(52) U.S. Cl.
CPC .................................. *G11B 5/4833* (2013.01)

(58) Field of Classification Search
None
See application file for complete search history.

(56) References Cited

U.S. PATENT DOCUMENTS

| | | | |
|---|---|---|---|
| 5,185,683 A | 2/1993 | Oberg et al. | |
| 5,444,587 A * | 8/1995 | Johnson | G11B 5/4813 |
| 5,461,524 A * | 10/1995 | Jurgenson | G11B 5/5521 |
| 5,689,389 A * | 11/1997 | Braunheim | G11B 21/16 |
| 5,757,586 A * | 5/1998 | Budde | G11B 21/26 |
| 5,808,835 A * | 9/1998 | Fujiwara | G11B 5/4813 |
| 5,963,383 A | 10/1999 | Jurgenson | |
| 8,049,995 B1 | 11/2011 | Ee et al. | |
| 8,233,239 B1 * | 7/2012 | Teo | G11B 5/4813 360/244.6 |
| 8,804,286 B1 * | 8/2014 | Aparimarn | G11B 5/4833 360/265.9 |
| 11,410,692 B1 * | 8/2022 | Tsuchida | G11B 5/4826 |
| 2003/0128473 A1 * | 7/2003 | Takagi | G11B 5/4813 |
| 2010/0315746 A1 * | 12/2010 | Aoki | G11B 5/4813 |
| 2012/0023734 A1 * | 2/2012 | Hanya | G11B 5/4813 29/700 |

(Continued)

FOREIGN PATENT DOCUMENTS

| | | | | |
|---|---|---|---|---|
| EP | 438806 A | * 7/1991 | | G11B 5/5521 |
| JP | H07-296534 A | 11/1995 | | |
| KR | 20070070127 A | * 7/2007 | | G11B 21/02 |

*Primary Examiner* — William J Klimowicz
(74) *Attorney, Agent, or Firm* — Kim & Stewart LLP (57) ABSTRACT

A disk device according to an embodiment includes a first suspension and a second suspension. The first suspension has a first base plate mounted to the arm. The second suspension has a second base plate mounted to the arm. The arm with a through-hole includes a first surface, a second surface, and an inner surface. The through-hole is open to the first surface and the second surface. The inner surface defines the through-hole. The first base plate includes a first boss accommodated in the through-hole in contact with the inner surface. The second base plate includes a second boss accommodated in the through-hole in contact with the inner surface. The second boss is at least partly held between the inner surface and the first boss.

13 Claims, 7 Drawing Sheets

(56) References Cited

U.S. PATENT DOCUMENTS

| | | | |
|---|---|---|---|
| 2021/0295864 A1* | 9/2021 | Teo | G11B 5/4813 |
| 2023/0142693 A1* | 5/2023 | Tsuchida | G11B 5/4826 |
| | | | 360/245.3 |
| 2025/0140286 A1* | 5/2025 | Okazaki | G11B 5/4826 |

* cited by examiner

DISK DEVICE

CROSS-REFERENCE TO RELATED APPLICATIONS

This application is based upon and claims the benefit of priority from Japanese Patent Application No. 2023-124356, filed on Jul. 31, 2023; the entire contents of which are incorporated herein by reference.

FIELD

Embodiments described herein relate generally to a disk device.

BACKGROUND

A disk device such as a hard disk drive (HDD) typically includes, for example, magnetic disks and a head stack assembly (HSA). The HSA includes a rotatable carriage with arms, base plates attached to the arms of the carriage, loadbeams extending from the base plates, flexures attached to the loadbeams, and magnetic heads mounted on the flexures.

Each base plate includes a boss. Each arm is provided with a through-hole into which the boss is fitted. The base plate is attached to the arm by joining the boss into the inner surface, i.e., the through-hole, of the arm. The arms of the carriage, except for the arms at both ends, has two base plates attached thereto.

For example, the arm may have a thinner thickness, resulting in decreasing the length of the through-hole. This will limit the lengths and arrangement of two bosses to be fitted into the through-hole. Such a limitation may hinder producing a sufficient force for joining either or both of the two bosses into the inner surface of the through-hole.

DETAILED DESCRIPTION

A disk device according to an embodiment includes a first magnetic head, a second magnetic head, a carriage, a first suspension, and a second suspension. The carriage includes an arm and is configured to rotate. The first suspension has a first base plate mounted to the arm, to hold the first magnetic head. The second suspension has a second base plate mounted to the arm, to hold the second magnetic head. The arm with a through-hole includes a first surface, a second surface, and an inner surface. The through-hole is open to the first surface. The second surface is opposite the first surface. The through-hole is open to the second surface. The inner surface defines the through-hole. The first base plate includes a third surface and a first boss. The third surface faces the first surface. The first boss protrudes from the third surface to be accommodated in the through-hole in contact with the inner surface. The second base plate includes a fourth surface and a second boss. The fourth surface faces the second surface. The second boss protrudes from the fourth surface to be accommodated in the through-hole in contact with the inner surface. The second boss is at least partly held between the inner surface and the first boss.

First Embodiment

A first embodiment will be described below with reference to FIGS. 1 to 5. Note that, in some cases, a plurality of expressions is given for component elements according to the embodiments and for description of the component elements, in the present specification. The component elements and the descriptions thereof are made by way of examples and are not limited to the expressions in the present specification. The component elements can be identified by names different from those in the present specification, as well. In addition, different expressions from those in the present specification can be given for the component elements.

In descriptions below, "suppress" is defined as, for example, preventing occurrence of an event, action, or influence, or reducing the degree of the event, action, or influence.

Figure 1:
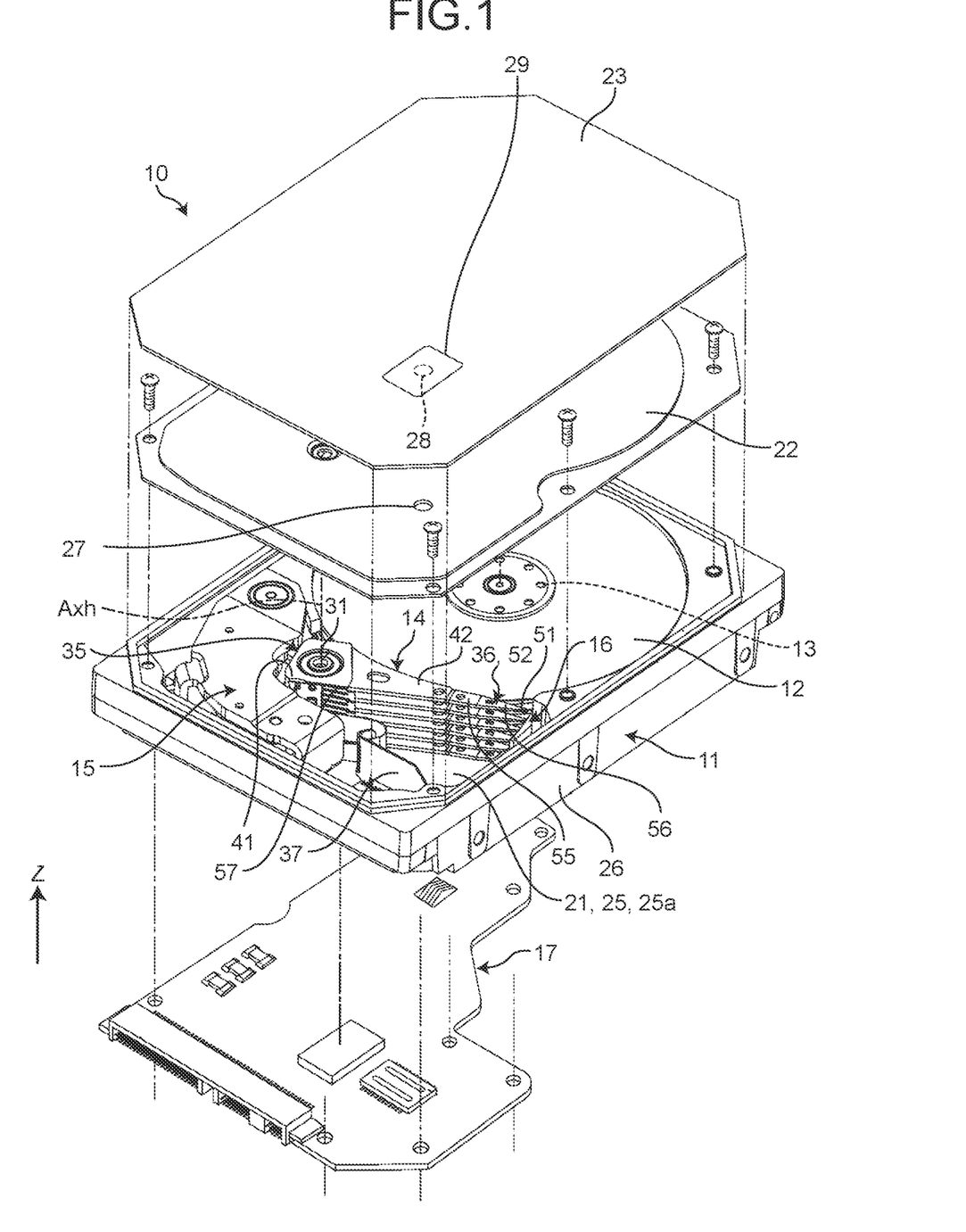
FIG. 1 is an exemplary exploded perspective view of an HDD according to a first embodiment.

FIG. 1 is an exemplary perspective view of a hard disk drive (HDD) 10 according to the first embodiment. The HDD 10 is an example of the disk device and can also be referred to as an electronic device, storage device, external storage device, or magnetic disk device.

As illustrated in FIG. 1, the HDD 10 includes a housing 11, a plurality of magnetic disks 12, a spindle motor 13, a head stack assembly (HSA) 14, a voice coil motor (VCM) 15, a ramp load mechanism 16, and a printed circuit board (PCB) 17. Each of the magnetic disks 12 may also be referred to as a disk or a platter.

As illustrated in FIG. 1, in the present specification, a Z-axis and a Z direction are defined for convenience. The Z-axis is provided along the thickness of the HDD 10. The Z direction is a direction extending along the Z-axis, and includes a +Z direction that is indicated by a Z-axis arrow and a −Z direction that is an opposite direction to the direction indicated by the Z-axis arrow.

The housing 11 accommodates the plurality of magnetic disks 12, the spindle motor 13, the HSA 14, the VCM 15, and the ramp load mechanism 16. The housing 11 includes a base 21, an inner cover 22, and an outer cover 23. Note that the housing 11 is not limited to this example.

The base 21 has a substantially rectangular parallelepiped box shape opened in the +Z direction. The base 21 includes a bottom wall 25 and a side wall 26. The bottom wall 25 has a substantially rectangular (quadrangular) plate shape that extends substantially orthogonal to the Z direction. The bottom wall 25 includes a bottom surface 25a facing substantially in the +Z direction. The side wall 26 protrudes from the edges of the bottom wall 25 substantially in the +Z direction and has a substantially rectangular frame shape.

The inner cover 22 is mounted to an end of the side wall 26 in the +Z direction with, for example, screws to close the base 21. The outer cover 23 covers the inner cover 22 and is mounted to the end of the side wall 26 in the +Z direction, for example, by welding.

The inner cover 22 is provided with a breather hole 27. The outer cover 23 is provided with a breather hole 28. After components are mounted inside the base 21 and the inner cover 22 and the outer cover 23 are mounted to the base 21, air in the housing 11 is removed from the breather holes 27 and 28. Furthermore, the housing 11 is filled with a gas different from the air.

The gas filling the housing 11 is, for example, a low density gas having a density lower than that of the air, an inert gas of low reactivity, or the like. For example, the housing 11 is filled with helium. Note that another fluid may fill the housing 11.

The breather hole 28 of the outer cover 23 is closed by a seal 29. The seal 29 hermetically seals the breather hole 28 to restrict the fluid in the housing 11 from leaking to the outside of the housing 11 from the breather hole 28.

The plurality of magnetic disks 12 extends orthogonally to the Z direction. The plurality of magnetic disks 12 is arranged at intervals in the Z direction. Each of the magnetic disks 12 is provided with magnetic recording layers on both sides.

The spindle motor 13 supports the plurality of magnetic disks 12. The plurality of magnetic disks 12 is held on a hub of the spindle motor 13, for example, using a clamp spring. The spindle motor 13 rotates the plurality of magnetic disks 12 together.

The housing 11 further includes a support shaft 31 spaced apart from the magnetic disks 12. The support shaft 31 protrudes, for example, from the bottom surface 25a of the bottom wall 25 substantially in the +Z direction. The HSA 14 is rotatably supported by the support shaft 31.

The HSA 14 is rotatable about an axis Axh. The axis Axh is a virtual axis extending substantially in the Z direction. The axis Axh is, for example, the center of the rotation of the HSA 14 and also the axis of the support shaft 31.

The HSA 14 includes a carriage 35, a plurality of head gimbal assemblies (HGAs) 36, and a flexible printed circuit board (FPC) 37. The carriage 35 includes an actuator block 41 and a plurality of arms 42.

The actuator block 41 and the plurality of arms 42 are integrally formed of, for example, an aluminum alloy. Note that the material of the actuator block 41 and the arms 42 is not limited to this example.

The actuator block 41 is mounted to the support shaft 31 via a bearing, for example, so as to be rotatable about the axis Axh. Accordingly, the carriage 35 is rotatable about the axis Axh of the support shaft 31.

Figure 2:
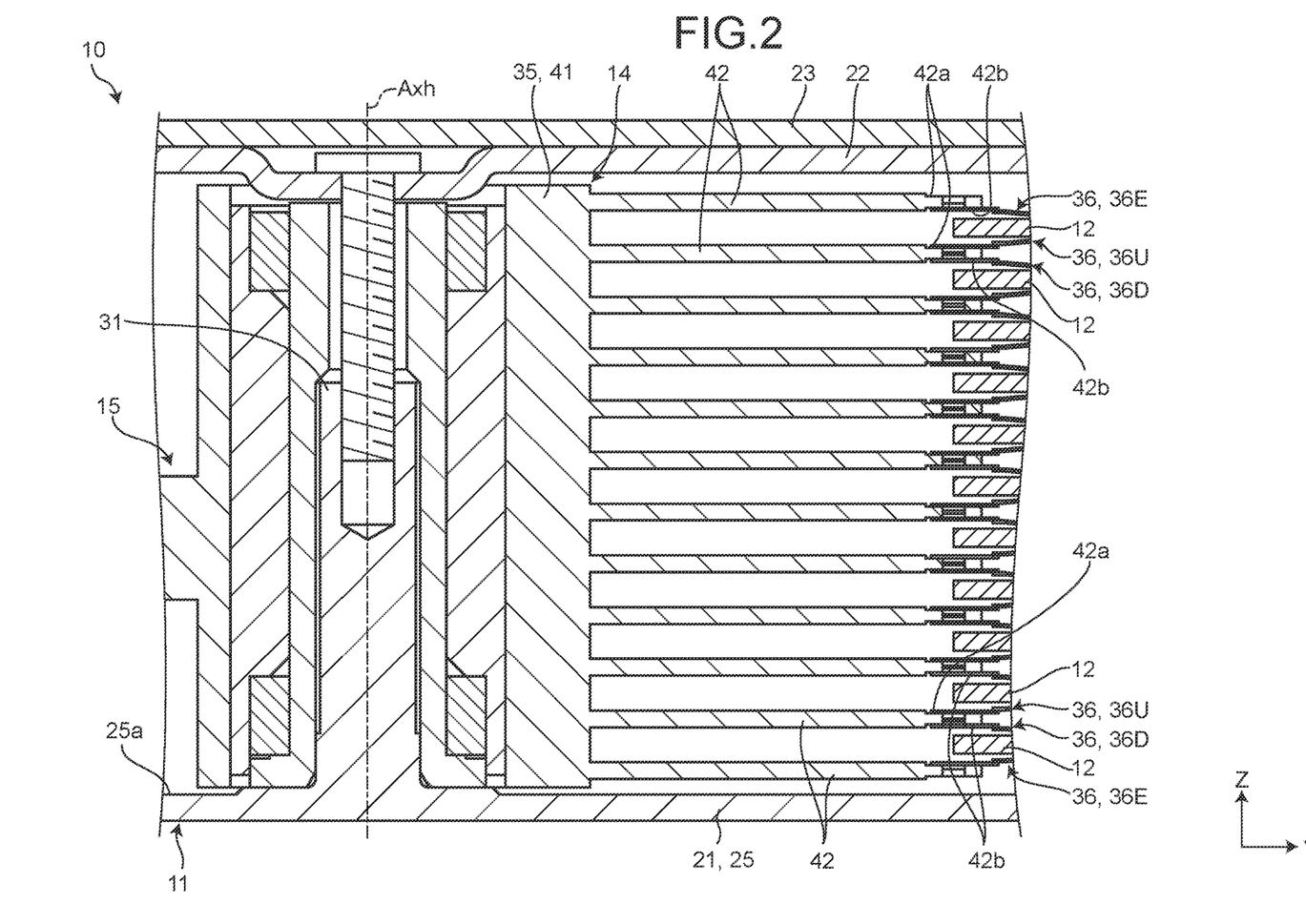
FIG. 2 is an exemplary cross-sectional view of a portion of the HDD of the first embodiment.

FIG. 2 is an exemplary cross-sectional view of a portion of the HDD 10 of the first embodiment. As illustrated in FIG. 2, the plurality of arms 42 protrude from the actuator block 41 substantially in a direction orthogonal to the axis Axh. Note that the HSA 14 may be divided so that the arms 42 may protrude from a plurality of the actuator blocks 41.

Figure 3:
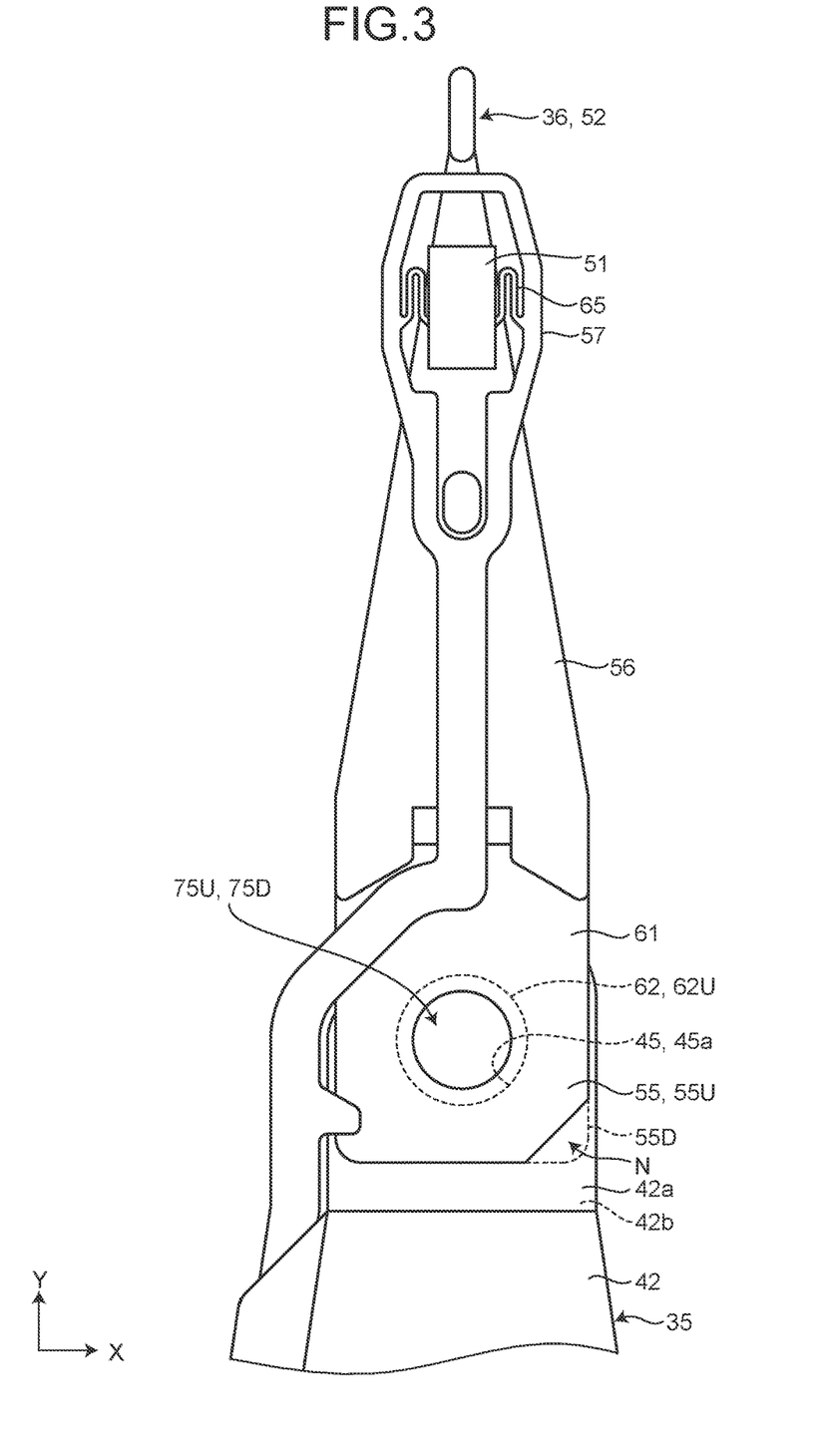
FIG. 3 is an exemplary plan view partially illustrating an HGA and an arm of the first embodiment.

FIG. 3 is an exemplary plan view partially illustrating an HGA 36 and an arm 42 of the first embodiment. As illustrated in FIG. 3, an X-axis and a Y-axis are further defined for convenience, in the present specification. The X-axis, the Y-axis, and the Z-axis are orthogonal to each other. The Y-axis is provided along the arm 42. Furthermore, an X direction and a Y direction are defined, in the present specification. The X direction is a direction extending along the X-axis, and includes a +X direction that is indicated by an X-axis arrow and a −X direction that is an opposite direction to the direction indicated by the X-axis arrow. The Y direction is a direction extending along the Y-axis, and includes a +Y direction that is indicated by a Y-axis arrow and a −Y direction that is an opposite direction to the direction indicated by the Y-axis arrow.

The plurality of arms 42 protrudes from the actuator block 41 in the +Y direction. Thus, the Y direction corresponds to a longitudinal direction of the arms 42. The X direction corresponds to a transverse direction of the arms 42. The X direction and the Y direction change as the carriage 35 rotates about the axis Axh.

As illustrated in FIG. 2, the plurality of arms 42 is arranged at intervals in the Z direction. Each of the arms 42 has a plate shape so as to enter a gap between adjacent magnetic disks 12. The plurality of arms 42 extends substantially in parallel.

Figure 4:
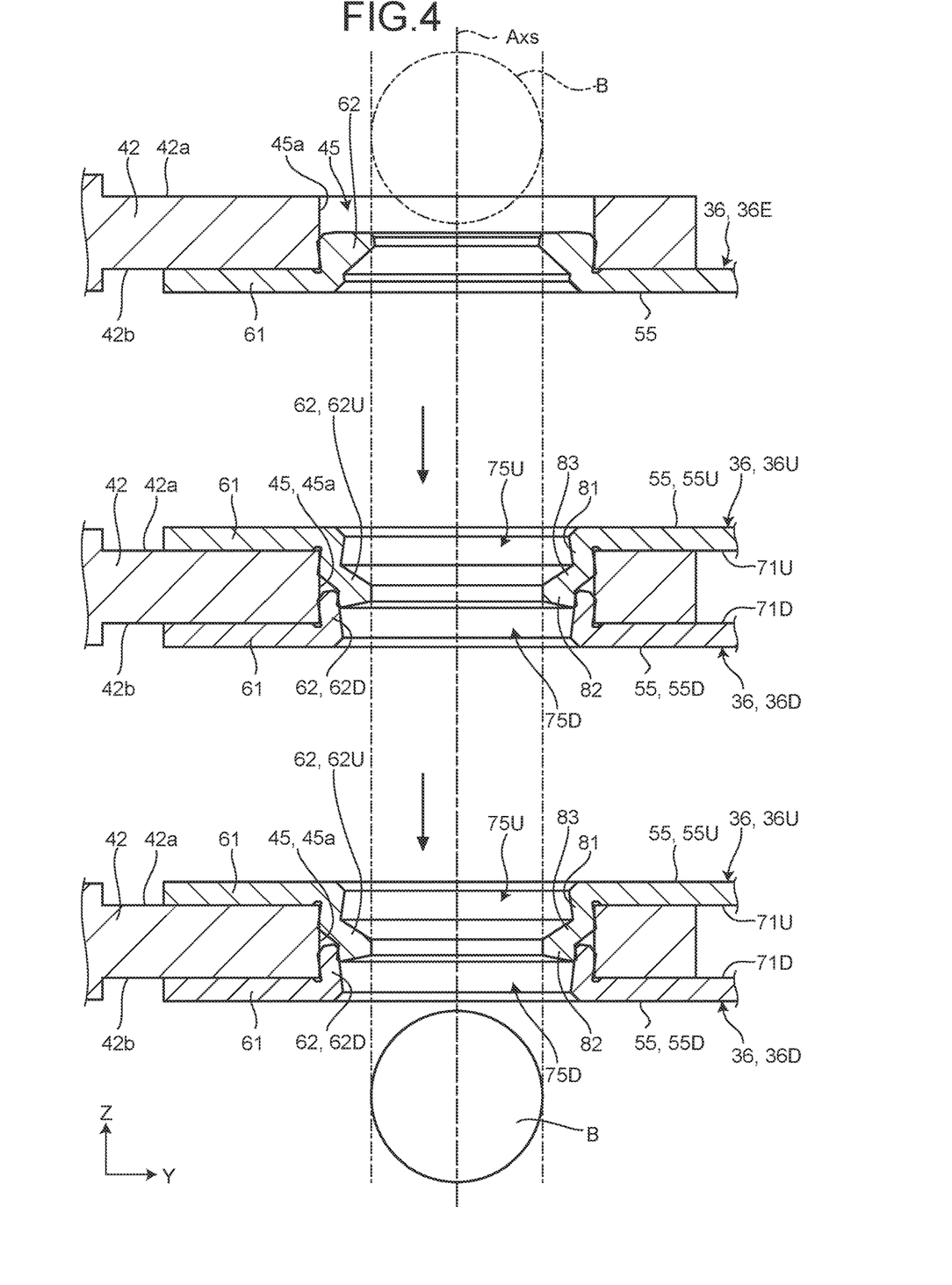
FIG. 4 is an exemplary cross-sectional view partially illustrating a plurality of the HGAs and a plurality of the arms of the first embodiment.

FIG. 4 is an exemplary cross-sectional view partially illustrating the plurality of HGAs 36 and a plurality of the arms 42 of the first embodiment. As illustrated in FIG. 4, each of the plurality of the arms 42 has two seating surfaces 42a and 42b. The seating surface 42a is an example of the first surface. The seating surface 42b is an example of the second surface.

The seating surfaces 42a and 42b are located at an end of the arm 42 in the +Y direction. The seating surface 42a is substantially flat and faces substantially in the +Z direction. The seating surface 42b is opposite the seating surfaces 42a. The seating surface 42b is substantially flat and faces substantially in the −Z direction.

Each of the plurality of arms 42 is provided with a swage hole 45. The swage hole 45 is an example of the through-hole. The swage hole 45 is a circular hole open to the seating surfaces 42a and 42b through the arm 42 substantially in the Z direction.

Each of the plurality of arms 42 further includes an inner surface 45a that forms (defines) the swage hole 45. The inner surface 45a is a substantially cylindrical curved surface extending substantially in the Z direction. In the present embodiment, the inner surface 45a has a substantially constant diameter.

Each of the plurality of HGAs 36 is mounted to the seating surface 42a or the seating surface 42b so as to protrude from the arm 42 substantially in the +Y direction. Therefore, the plurality of HGAs 36 is arranged at intervals in the Z direction.

As illustrated in FIG. 2, the plurality of HGAs 36 includes two HGAs 36E, a plurality of HGAs 36U, and a plurality of HGAs 36D. The HGAs 36E, 36U, and 36D are substantially identical to each other or substantially mirror-symmetrical to each other, except for the points particularly described below. In the following description, features common to the HGAs 36E, 36U, and 36D will be described as the features of the HGA 36.

The two HGAs 36E are mounted to two of the plurality of arms 42, the two of which are located at both ends. One of the two HGAs 36E is mounted to the seating surface 42b of an arm 42 positioned at an end in the +Z direction. The other of the two HGAs 36E is mounted to the seating surface 42a of an arm 42 at an end in the −Z direction.

The plurality of HGAs 36U and 36D are disposed between the two HGAs 36E. The plurality of HGAs 36U are mounted to the seating surfaces 42a of the arms 42 between the two HGAs 36E. The plurality of HGAs 36D are mounted to the seating surfaces 42b of the arms 42 between the two HGAs 36E. In other words, the two HGAs 36U and 36D are respectively mounted to the two seating surfaces 42a and 42b of the plurality of arms 42, between the two HGAs 36E.

As illustrated in FIG. 3, each of the plurality of HGAs 36 includes a magnetic head 51 and a suspension 52. The magnetic head 51 can also be referred to as a slider. The magnetic head 51 and the suspension 52 of the HGA 36U are examples of the first magnetic head and the first suspension. The magnetic head 51 and the suspension 52 of the HGA 36D are examples of the second magnetic head and the second suspension.

The magnetic head 51 records and reproduces information to and from a corresponding one of the plurality of magnetic disks 12. In other words, the magnetic head 51 reads and writes information from and to the magnetic disk 12.

Each suspension 52 is mounted to the arms 42, holding the magnetic head 51. The suspension 52 includes a base plate 55, a loadbeam 56, and a flexure 57.

The base plate 55 and the loadbeam 56 are formed of, for example, stainless steel. Note that the material of the base plate 55 and the loadbeam 56 is not limited to this example. The base plate 55 and the loadbeam 56 may be formed of materials different from each other.

As illustrated in FIG. 4, the base plate 55 includes a plate 61 and a boss 62. The plate 61 has a substantially quadrangular plate shape substantially orthogonal to the Z direction. The boss 62 protrudes from the plate 61. The boss 62 has a substantially cylindrical shape and is fitted into the swage hole 45 of the arm 42.

The boss 62 is swaged to the arm 42 to mount the base plate 55 to the arm 42 of the carriage 35. The base plate 55 may be mounted to the arm 42 by another method.

The loadbeam 56 has a thin plate shape that is smaller in thickness than the base plate 55. As illustrated in FIG. 3, the loadbeam 56 is mounted to the plate 61, for example, by spot welding. The loadbeam 56 may be mounted to the plate 61 by other means.

The loadbeam 56 extends from the plate 61 substantially in the +Y direction. For example, the loadbeam 56 extends obliquely from the plate 61 toward the corresponding magnetic disk 12.

The flexure 57 is a kind of flexible printed wiring board of an elongated strip shape. The flexure 57 includes, for example, a metal backing layer, an insulating base layer, a conductive layer, and a cover layer as an insulating layer.

The flexure 57 extends along the arm 42, the loadbeam 56, and the plate 61. The flexure 57 is mounted to the loadbeam 56 and the plate 61, for example, by spot welding.

A gimbal 65 is disposed at an end portion of the flexure 57 in the +Y direction. The magnetic head 51 is mounted to the gimbal 65. The gimbal 65 holds the magnetic head 51 in a swingable manner.

As illustrated in FIG. 1, an end portion of the flexure 57 in the -Y direction is connected to one end portion of the FPC 37 mounted to the actuator block 41. Therefore, the flexure 57 electrically connects the magnetic head 51 and the FPC 37. The other end portion of the FPC 37 is connected to a connector disposed at the bottom wall 25.

The carriage 35, the magnetic head 51, and the suspension 52 are accommodated in the housing 11. The suspension 52 of the HGA 36D is located closer to the bottom surface 25a than the suspension 52 of the HGA 36U. The arrangement of the HGAs 36U and 36D may be reversed.

The VCM 15 includes a voice coil, a pair of yokes, and magnets provided at the yokes. The voice coil is held in the actuator block 41. The VCM 15 rotates the carriage 35 about the axis Axh to move the magnetic heads 51 to a desired position.

When the magnetic heads 51 move to the outer edges of the magnetic disks 12 by the rotation of the HSA 14 by the VCM 15, the ramp load mechanism 16 of FIG. 1 holds the magnetic heads 51 away from the magnetic disks 12.

The PCB 17 is, for example, a rigid board such as a glass epoxy board, and includes a multi-layer board, a build-up board, or the like. The PCB 17 is mounted on the bottom wall 25 outside the housing 11.

Various electronic components are mounted on the PCB 17, such as a relay connector electrically connected to the FPC 37, an interface (I/F) connector connected to a host computer, and a controller controlling the operation of the HDD 10. The relay connector is electrically connected to the FPC 37 via the connector provided at the bottom wall 25. A controller of the PCB 17 controls, for example, the spindle motor 13, the VCM 15, and the magnetic heads 51.

As illustrated in FIG. 4, in the following description, the base plate 55 and the boss 62 of each HGA 36U are referred to as a base plate 55U and a boss 62U. The base plate 55U is an example of the first base plate. The boss 62U is an example of the first boss.

Furthermore, in the following description, the base plate 55 and the boss 62 of each HGA 36D are referred to as a base plate 55D and a boss 62D. The base plate 55D is an example of the second base plate. The boss 62D is an example of the second boss.

The plate 61 of the base plate 55U has a flat surface 71U. The flat surface 71U is an example of the third surface. The flat surface 71U is substantially level and faces substantially in the -Z direction. The flat surface 71U faces and contacts with the seating surface 42a the seating surface 42a.

The boss 62U protrudes from the flat surface 71U substantially in the -Z direction to be accommodated in the swage hole 45. The base plate 55U is attached to the arm 42 by swaging the boss 62U to the inner surface 45a of the swage hole 45.

The plate 61 of the base plate 55D has a flat surface 71D. The flat surface 71D is an example of the fourth surface. The flat surface 71D is substantially level and faces substantially in the +Z direction. The flat surface 71D faces and contacts with the seating surface 42b.

The boss 62D protrudes from the flat surface 71D substantially in the +Z direction to be accommodated in the swage hole 45. The base plate 55D is attached to the arm 42 by swaging the boss 62D to the inner surface 45a of the swage hole 45.

The base plate 55U is provided with an insertion hole 75U. The insertion hole 75U passes through the inside of the boss 62U of substantially cylindrical shape and penetrates the base plate 55U substantially in the Z direction. The base plate 55D is further provided with an insertion hole 75D. The insertion hole 75D passes through the inside of the boss 62D of substantially cylindrical shape and penetrates the base plate 55D substantially in the Z direction.

The swage hole 45 and the insertion holes 75U and 75D extend along the same axis Axs. In other words, the swage hole 45 and the insertion holes 75U and 75D are arranged coaxially. Note that the axes of the swage hole 45 and the insertion holes 75U and 75D may be different from each other.

The axis Axs is a virtual axis extending substantially in the Z direction. In other words, the axis Axh of the rotation of the HSA 14 and the axis Axs of the swage hole 45 are substantially in parallel. Furthermore, the swage holes 45 of the plurality of arms 42 extend along the axis Axs.

Hereinafter, an axial direction, a radial direction (radially), and a circumferential direction (circumferentially) are defined for convenience. The axial direction is a direction along the axis Axs. The axial direction matches the Z direction. The radial direction is a direction orthogonal to the axis Axs, and includes a plurality of directions orthogonal to the axis Axs. The circumferential direction is a direction rotating around the axis Axs, and includes a clockwise direction and a counterclockwise direction around the axis Axs.

Figure 5:
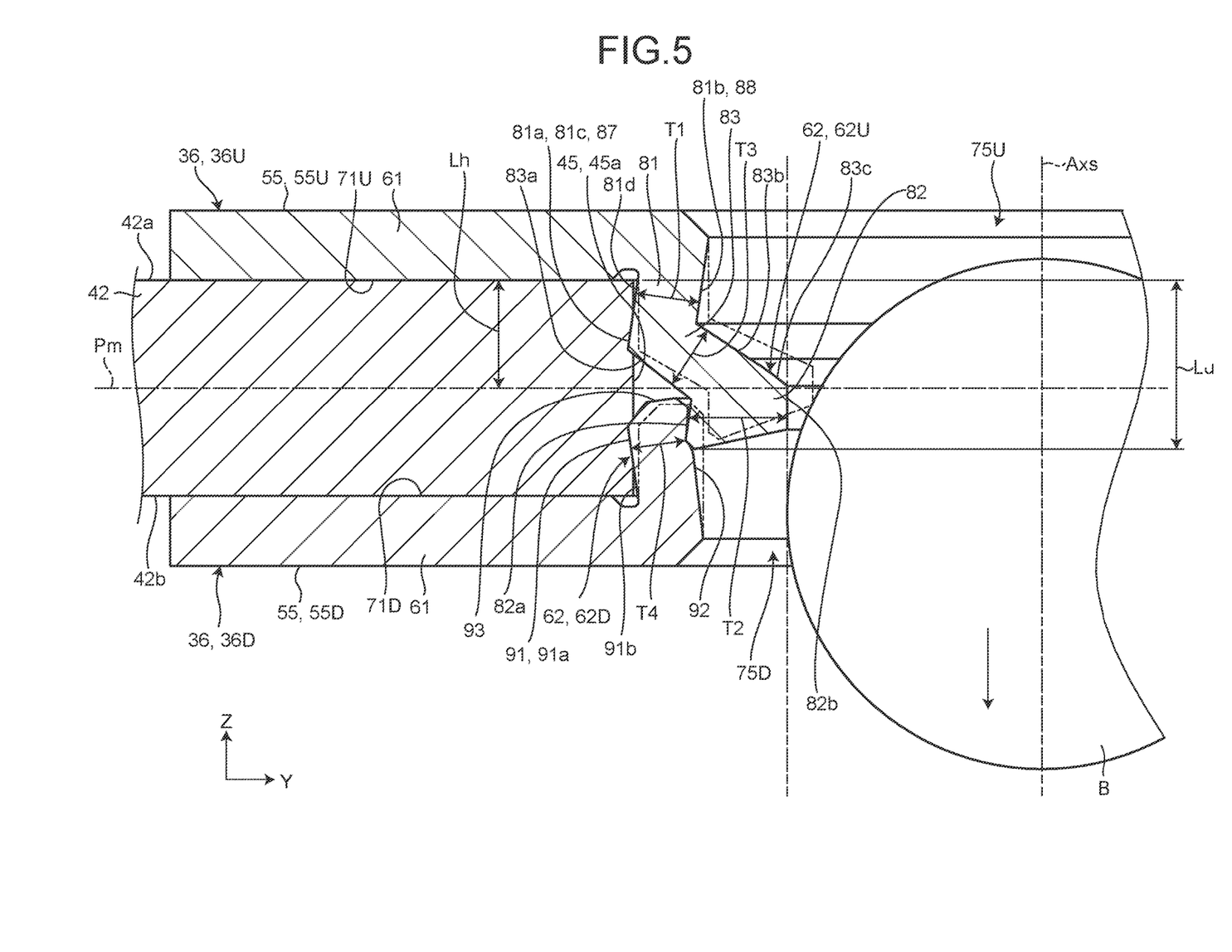
FIG. 5 is an exemplary cross-sectional view partially illustrating an arm and base plates of the first embodiment.

FIG. 5 is an exemplary cross-sectional view partially illustrating the arm 42 and the base plates 55U and 55D of the first embodiment. As illustrated in FIG. 5, the boss 62U includes an outer annular part 81, an inner annular part 82, and an intermediate part 83. The outer annular part 81 is an example of a first part. The inner annular part 82 is an example of a second part.

The outer annular part 81 is substantially cylindrical and protrudes from the flat surface 71U substantially in the −Z direction. The outer annular part 81 includes an outer peripheral surface 81a and an inner peripheral surface 81b. The outer peripheral surface 81a is an example of a first outer side surface. The inner peripheral surface 81b is an example of a first inner side surface.

The outer peripheral surface 81a is a substantially cylindrical curved surface facing radially outward. The outer peripheral surface 81a faces the inner surface 45a of the swage hole 45. The outer peripheral surface 81a includes a contact region 81c and a separate region 81d.

The contact region 81c is a substantially cylindrical curved surface that is separated from the flat surface 71U substantially in the −Z direction and extends circumferentially. The contact region 81c of the outer peripheral surface 81a of the outer annular part 81 is in contact with the inner surface 45a. In the circumferential direction the contact region 81c is in contact with the inner surface 45a substantially entirely. In the present embodiment, the contact region 81c digs into the inner surface 45a by swaging the boss 62U into the inner surface 45a. This configuration joins the contact region 81c of the outer peripheral surface 81a to the inner surface 45a.

The separate region 81d is a substantially cylindrical curved surface between the flat surface 71U and the contact region 81c and extends circumferentially. The contact region 81c and the separate region 81d form a continuous, substantially cylindrical curved surface. The separate region 81d is away from the inner surface 45a.

The inner peripheral surface 81b is opposite the outer peripheral surface 81a. The inner peripheral surface 81b is a substantially cylindrical curved surface facing radially inward. In other words, the inner peripheral surface 81b faces inside the swage hole 45. The outer annular part 81 has a substantially constant thickness T1. The thickness T1 corresponds to the distance between the outer peripheral surface 81a and the inner peripheral surface 81b.

In the present embodiment, the outer peripheral surface 81a and the inner peripheral surface 81b of the outer annular part 81 have a substantially conical shape tapered in the +Z direction. Thus, the separate region 81d and the inner surface 45a are at a longest distance at an end of the separate region 81d in the +Z direction.

The inner annular part 82 is substantially annular and further away from the flat surface 71U than the outer annular part 81 in the −Z direction. The inner annular part 82 includes an outer peripheral surface 82a and an inner peripheral surface 82b. The outer peripheral surface 82a is an example of a second outer side surface. The inner peripheral surface 82b is an example of a second inner side surface.

The outer peripheral surface 82a is a substantially cylindrical curved surface facing radially outward. The outer peripheral surface 82a faces the inner surface 45a of the swage hole 45. The diameter of the outer peripheral surface 82a of the inner annular part 82 is smaller than the diameter of the outer peripheral surface 81a of the outer annular part 81. The outer peripheral surface 82a is further away from the inner surface 45a than the outer peripheral surface 81a. The outer peripheral surface 82a and the inner surface 45a oppose each other with spacing.

The inner peripheral surface 82b is opposite the outer peripheral surface 82a. The inner peripheral surface 82b is a substantially cylindrical curved surface facing radially inward. In other words, the inner peripheral surface 82b faces inside the swage hole 45. The inner annular part 82 has a substantially constant thickness T2. The thickness T2 corresponds to the distance between the outer peripheral surface 82a and the inner peripheral surface 82b.

The intermediate part 83 is located between the outer annular part 81 and the inner annular part 82. The inner annular part 82 is connected to the outer annular part 81 via the intermediate part 83. Note that the inner annular part 82 may be directly connected to the outer annular part 81. The intermediate part 83 includes an outer inclined surface 83a and an inner inclined surface 83b. The inner inclined surface 83b is an example of an inclined surface.

The outer inclined surface 83a extends obliquely to the axis Axs, between an end of the outer peripheral surface 81a in the −Z direction and an end of the outer peripheral surface 82a in the +Z direction. The inner inclined surface 83b is opposite the outer inclined surface 83a. The inner inclined surface 83b extends obliquely to the axis Axs, between an end of the inner peripheral surface 81b in the −Z direction and an end of the inner peripheral surface 82b in the +Z direction.

The outer inclined surface 83a and the inner inclined surface 83b both have a substantially conical shape tapered in the −Z direction. In other words, the outer inclined surface 83a has a substantially conical shape extending between the outer peripheral surface 81a and the outer peripheral surface 82a and tapered toward the outer peripheral surface 82a. Furthermore, the inner inclined surface 83b has a substantially conical shape extending between the inner peripheral surface 81b and the inner peripheral surface 82b and tapered toward the inner peripheral surface 82b. The intermediate part 83 has a substantially constant thickness T3. The thickness T3 corresponds to the distance between the outer inclined surface 83a and the inner inclined surface 83b.

The thickness T1 of the outer annular part 81 is smaller than the thickness T2 of the inner annular part 82. The thickness T1 of the outer annular part 81 is substantially equal to the thickness T3 of the intermediate part 83. In other words, the inner annular part 82 is thicker than the outer annular part 81 and than the intermediate part 83.

The boss 62U protruding from the flat surface 71U has a length Lu larger than a half Lh of the distance between the two seating surfaces 42a and 42b. The length Lu corresponds to the axial length of the boss 62U. The boss 62U includes an outer peripheral surface 87 and an inner peripheral surface 88. The outer peripheral surface 87 is an example of an outer side surface. The inner peripheral surface 88 is an example of an inner side surface.

The outer peripheral surface 87 of the boss 62U includes the outer peripheral surface 81a of the outer annular part 81, the outer peripheral surface 82a of the inner annular part 82, and the outer inclined surface 83a of the intermediate part 83. The outer peripheral surface 87 and the inner surface 45a oppose each other.

The inner peripheral surface 88 of the boss 62U includes the inner peripheral surface 81*b* of the outer annular part 81, the inner peripheral surface 82*b* of the inner annular part 82, and the inner inclined surface 83*b* of the intermediate part 83. The inner peripheral surface 88 forms (defines) the insertion hole 75U. The inner peripheral surface 88 faces inside the swage hole 45.

Of the inner peripheral surface 88 of the boss 62U, the inner peripheral surface 82*b* of the inner annular part 82 is located innermost in the swage hole 45. The inner peripheral surface 82*b* is at least partially located between a center plane Pm and the seating surface 42*b*. In other words, the inner peripheral surface 82*b* is located between the two seating surfaces 42*a* and 42*b*. The center plane Pm is a virtual central plane between the two seating surfaces 42*a* and 42*b*. In the present embodiment, the axial center of the inner peripheral surface 82*b* is located between the center plane Pm and the seating surface 42*b*.

At least part of the boss 62D is held between the inner surface 45*a* and the boss 62U. In other words, the boss 62D and the boss 62U at least partly overlap each other in the radial direction. In the present embodiment, at least part of the boss 62D is held between the inner surface 45*a* and the outer peripheral surface 82*a* of the inner annular part 82.

The boss 62D includes an outer peripheral surface 91, an inner peripheral surface 92, and an end surface 93. The outer peripheral surface 91 is a substantially cylindrical curved surface facing radially outward. The outer peripheral surface 91 and the inner surface 45*a* of the swage hole 45 face each other. The outer peripheral surface 91 includes a contact region 91*a* and a separate region 91*b*.

The contact region 91*a* is a substantially cylindrical curved surface and extends circumferentially away from the flat surface 71D substantially in the +Z direction. The contact region 91*a* of the outer peripheral surface 91 is in contact with the inner surface 45*a*. In the present embodiment, the contact region 91*a* digs into the inner surface 45*a* by swaging the boss 62D into the inner surface 45*a*. This configuration joins the contact region 91*a* of the outer peripheral surface 91 to the inner surface 45*a*.

The separate region 91*b* is a substantially cylindrical curved surface, extending circumferentially between the flat surface 71D and the contact region 91*a*. The contact region 91*a* and the separate region 91*b* form a continuous, substantially cylindrical curved surface. The separate region 91*b* is away from the inner surface 45*a*.

The inner peripheral surface 92 is opposite the outer peripheral surface 91. The inner peripheral surface 92 is a substantially cylindrical curved surface facing radially inward. In other words, the inner peripheral surface 92 faces inside the swage hole 45. The inner peripheral surface 92 of the boss 62D is in contact with the outer peripheral surface 82*a* of the inner annular part 82.

The boss 62D has an approximately constant thickness, however, the boss 62D is compressed between the inner surface 45*a* of the swage hole 45 and the inner annular part 82 of the boss 62U. This may result in a difference between a thickness T4 of the contact portion of the boss 62D with the inner annular part 82 and the thickness of the portion separate from the boss 62U. The thickness T4 corresponds to the distance between the outer peripheral surface 91 and the inner peripheral surface 92.

The thickness T4 of the boss 62D is smaller than the thickness T1 of the outer annular part 81. In other words, the outer annular part 81 has a larger thickness than the boss 62D. For example, the boss 62D, when compressed between the inner surface 45*a* and the inner annular part 82, becomes thinner than the outer annular part 81. Note that the thickness T4 of the boss 62D is not limited to this example.

In the present embodiment, the outer peripheral surface 91 and the inner peripheral surface 92 of the boss 62D have a substantially conical shape tapered in the −Z direction. Thus, the separate region 91*b* and the inner surface 45*a* are most distant from each other at an end of the separate region 91*b* in the −Z direction.

The end surface 93 is located at an end of the boss 62D in the +Z direction. The +Z direction is an example of a direction in which the second boss protrudes from the fourth surface. The end surface 93 faces the outer annular part 81 and the intermediate part 83 of the boss 62U. In the present embodiment, the end surface 93 faces the outer inclined surface 83*a* of the intermediate part 83.

The end surface 93 is away from the boss 62U. The distance between the end surface 93 and the boss 62U is set to larger than the longest distance between the separate region 81*d* of the outer annular part 81 and the inner surface 45*a* of the swage hole 45. The distance between the end surface 93 and the boss 62U is also set to larger than the longest distance between the separate region 91*b* of the boss 62D and the inner surface 45*a* of the swage hole 45.

As illustrated in FIG. 4, the shape of the boss 62 of each of the HGAs 36E is different from the shapes of the bosses 62U and 62D. However, the shape of the boss 62 of the HGA 36E may be the same as the shape of, for example, the boss 62U.

As illustrated in FIG. 3, the plate 61 of the base plate 55U is provided with a cutout N. Meanwhile, the plate 61 of the base plate 55D is provided with a cutout of different shape rather than the cutout N. By the cutout N, the base plate 55 can be distinguished as the base plate 55U or the base plate 55D.

Hereinafter, an example of a method of swaging the base plates 55U and 55D that is part of a method of manufacturing the HDD 10, will be described. Note that the method of swaging the base plates 55U and 55D is not limited to the following method, and another method may be used.

First, the bosses 62U and 62D are inserted into the swage hole 45. In FIG. 5, the bosses 62U and 62D before swaging are represented by two-dot dash lines. The bosses 62U and 62D are inserted into the swage hole 45 so that the inner annular part 82 of the boss 62U and the boss 62D overlap each other in the radial direction.

Before swaging, the diameters of the outer peripheral surface 81*a* of the outer annular part 81 and the outer peripheral surface 91 of the boss 62D are smaller than the diameter of the inner surface 45*a* of the swage hole 45. Therefore, before swaging, the outer peripheral surface 81*a* of the outer annular part 81 and the outer peripheral surface 91 of the boss 62D are at least partially separated from the inner surface 45*a* of the swage hole 45 circumferentially.

Before swaging, the diameter of the outer peripheral surface 82*a* of the inner annular part 82 is smaller than the diameter of the inner peripheral surface 92 of the boss 62D. Therefore, before swaging, the outer peripheral surface 82*a* of the inner annular part 82 is at least partially separated from the inner peripheral surface 92 of the boss 62D circumferentially.

Next, a ball B passes through the swage hole 45 and the insertion holes 75U and 75D. The ball B is made of, for example, stainless steel. The ball B has a rigidity higher than the boss 62U and the boss 62D.

The ball B enters the insertion hole 75U first. In other words, the ball B swages the boss 62U being upstream and the boss 62D being downstream to the inner surface 45*a* through the insertion holes 75U and 75D. The ball B has a larger diameter than the inner peripheral surface 82b of the inner annular part 82 before swaging. Thus, the ball B makes contact with, for example, the inner inclined surface 83b of the intermediate part 83.

The ball B pushes the inner inclined surface 83b in the −Z direction. The boss 62U is pulled in the −Z direction by the ball B and plastically deformed so as to expand. Thereby, the outer peripheral surface 81a of the outer annular part 81 is joined to the inner surface 45a of the swage hole 45 by contact.

Furthermore, the outer peripheral surface 82a of the inner annular part 82 makes contact with the inner peripheral surface 92 of the boss 62D. Being compressed by the inner annular part 82, the boss 62D is plastically deformed so as to expand. Thereby, the outer peripheral surface 91 of the boss 62D is joined to the inner surface 45a of the swage hole 45 by contact.

The boss 62D is held between the inner surface 45a and the inner annular part 82 plastically deformed. In another expression, the inner annular part 82 presses the boss 62D onto the inner surface 45a. Thereby, the boss 62D is firmly joined to the inner surface 45a.

Meanwhile, the outer peripheral surface 82a of the inner annular part 82 is joined to the inner peripheral surface 92 of the boss 62D by contact. The boss 62D is joined to the inner surface 45a, so that the outer peripheral surface 82a of the inner annular part 82 is joined to the inner surface 45a via the boss 62D.

The boss 62D is plastically deformed and joined into the inner surface 45a while being pressed onto the inner surface 45a by the boss 62U. Thereby, the boss 62D is firmly swaged to the inner surface 45a of the swage hole 45.

The boss 62U is plastically deformed and directly joined into the inner surface 45a and is indirectly joined to the inner surface 45a via the boss 62D. In this manner, the boss 62U is also firmly swaged to the inner surface 45a of the swage hole 45.

As the inner annular part 82 expands, the diameter of the inner peripheral surface 82b of the inner annular part 82 matches or exceeds the diameter of the ball B. This allows the ball B to pass through the insertion holes 75U and 75D and enter the next insertion hole 75U. The ball B continuously passes through the insertion holes 75U and 75D of the base plates 55U and 55D.

The ball B pushes the inner inclined surface 83b in the −Z direction, thereby forming in the inner inclined surface 83b a curved surface 83c connected to the inner peripheral surface 82b. In other words, the inner inclined surface 83b includes the curved surface 83c. The curved surface 83c is part of the inner inclined surface 83b. However, the curved surface 83c may be the whole of the inner inclined surface 83b.

The curved surface 83c has a curved conical shape bulging toward the axis Axs. Because of this, the angle between the flat surface 71U and the curved surface 83c increases as the curved surface 83c is further distant away from the flat surface 71U. The ball B bends the inner annular part 82 and the intermediate part 83 so as to form the curved surface 83c. Note that no curved surface 83c may be formed in the inner inclined surface 83b.

As described above, the base plates 55U and 55D are mounted to the arm 42 by swaging. The boss 62 of the HGA 36E is mounted to the arm 42 by general swaging. In other words, the boss 62 of the HGA 36E is deformed by the ball B to expand and join to the inner surface 45a of the arm 42.

In the HDD 10 of the first embodiment described above, each arm 42 includes the seating surface 42a, the seating surface 42b opposite the seating surface 42a, and the inner surface 45a. The arm 42 is provided with the swage hole 45 open to the seating surface 42a and the seating surface 42b. The inner surface 45a defines the swage hole 45. The base plate 55U includes the flat surface 71U facing the seating surface 42a and the boss 62U protruding from the flat surface 71U. The boss 62U is accommodated in the swage hole 45 in contact with the inner surface 45a. The base plate 55D includes the flat surface 71D facing the seating surface 42b and the boss 62D protruding from the flat surface 71D. The boss 62D is accommodated in the swage hole 45 in contact with the inner surface 45a. At least part of the boss 62D is held between the inner surface 45a and the boss 62U.

The arm 42 may have a smaller thickness between the seating surface 42a and the seating surface 42b, which may result in a decrease in a direct contact area between the inner surface 45a and each of the boss 62U and the boss 62D. In this regard, the boss 62U of the present embodiment is joined to the inner surface 45a by contact, and at the same time holds the boss 62D between the inner surface 45a and the boss 62U. In other words, the boss 62U overlaps at least part of the boss 62D. The boss 62D is joined to the inner surface 45a by contact, and in addition the boss 62U helps the boss 62D more firmly join into the inner surface 45a. Furthermore, the boss 62U is joined to the inner surface 45a by contact itself and by contact via the boss 62D. Such a way of joining can implement the base plates 55U and 55D which can avoid a decrease in force for joining the boss 62U and the inner surface 45a and the boss 62D and the inner surface 45a, irrespective of whether the arm 42 has a smaller thickness between the seating surface 42a and the seating surface 42b. As such, the HDD 10 of the present embodiment enables the arm 42 of a smaller thickness between the seating surface 42a and the seating surface 42b, leading to increasing the number of the magnetic disks 12 to mount.

The boss 62U includes the outer peripheral surface 87 facing the inner surface 45a. At least part of the boss 62D is held between the inner surface 45a and the outer peripheral surface 87. This configuration makes it possible to more firmly join the boss 62D to the inner surface 45a, than the boss 62D held between two non-opposing surfaces.

The outer peripheral surface 87 includes the outer peripheral surface 81a and the outer peripheral surface 82a. The outer peripheral surface 81a is in contact with the inner surface 45a. The outer peripheral surface 82a is further away from the inner surface 45a than the outer peripheral surface 81a. The outer peripheral surface 82a and the inner surface 45a face each other. At least part of the boss 62D is held between the inner surface 45a and the outer peripheral surface 82a. This configuration makes it possible to allow the boss 62U to be stably in contact with the inner surface 45a to stably hold the boss 62D between the inner surface 45a and the outer peripheral surface 82a, as compared with the outer peripheral surface 87 of a constant diameter contacting the inner surface 45a and the boss 62D.

The boss 62U includes the inner peripheral surfaces 81b and 82b and the inner inclined surface 83b. The inner peripheral surface 81b is opposite the outer peripheral surface 81a. The inner peripheral surface 82b is opposite the outer peripheral surface 82a. The inner inclined surface 83b is tapered toward the inner peripheral surface 82b, extending between the inner peripheral surface 81b and the inner peripheral surface 82b. The inner inclined surface 83b includes the curved surface 83c connected to the inner peripheral surface 82b. The flat surface 71U and the curved surface 83c make a larger angle as the curved surface 83c is further distant from the flat surface 71U. In swaging the boss 62U and the boss 62D such that the boss 62U is an upstream side and the boss 62D is a downstream side, the ball B presses the inner inclined surface 83b in the −Z direction to form the curved surface 83c in the inner inclined surface 83b. The ball B's pressing the inner inclined surface 83b further ensures the contact between the outer peripheral surface 82a and the boss 62D, to be able to allow the boss 62U to hold the boss 62D between the inner surface 45a and the outer peripheral surface 82a.

The boss 62D protrudes from the flat surface 71D in the +Z direction and the +Z directional end surface 93 of the boss 62D is away from the boss 62U. Thereby, the end surface 93 of the boss 62D is unlikely or less likely to axially extrude the boss 62U from the swage hole 45.

The outer peripheral surface 87 includes the contact region 81c with the inner surface 45a, and the separate region 81d located between the contact region 81c and the flat surface 71U and away from the inner surface 45a. The end surface 93 and the boss 62U are at a longer distance than the longest distance between the separate region 81d and the inner surface 45a. Because of this, the boss 62D can be avoided from contacting the boss 62U at the end surface 93 due to, for example, dimensional variations.

The boss 62U includes the outer annular part 81 and the inner annular part 82. The outer annular part 81 protrudes from the flat surface 71U to contact with the inner surface 45a. The inner annular part 82 is further away from the flat surface 71U than the outer annular part 81, and has a larger thickness than the outer annular part 81. At least part of the boss 62D is held between the inner surface 45a and the inner annular part 82. In other words, the inner annular part 82 holding the boss 62D is larger in thickness than the outer annular part 81 contacting the inner surface 45a. In swaging, a thicker-thickness part can be typically joined more firmly than a thinner-thickness part. Consequently, it is possible to more firmly join the boss 62U to the inner surface 45a via the boss 62D and the boss 62D to the inner surface 45a by the boss 62U.

The outer annular part 81 is larger in thickness than the boss 62D. This can facilitate setting of a larger thickness to the inner annular part 82 of the boss 62U, as compared with the boss 62D being larger in thickness than the outer annular part 81. In addition, by being compressed, the boss 62D decreases in thickness between, for example, the inner surface 45a and the inner annular part 82. In other words, the inner annular part 82 can more firmly hold the boss 62D as the boss 62D decreases in thickness between the inner surface 45a and the inner annular part 82, which can prevent or restrict the boss 62D from coming off from the swage hole 45.

The boss 62U includes the inner peripheral surface 88 facing inside the swage hole 45. When joining the boss 62U to the inner surface 45a by swaging, the ball B presses, for example, the innermost inner peripheral surface 82b of the inner peripheral surface 88 in the swage hole 45. In other words, by being pressed at the inner peripheral surface 82b by the ball B, the boss 62U holds the boss 62D between the inner surface 45a and the boss 62U. The inner peripheral surface 82b is located between the seating surface 42a and the seating surface 42b. Because of this, the boss 62U, pressed by the ball B, can more directly press the boss 62D onto the inner surface 45a. As a result, the boss 62U can more surely hold the boss 62D between the inner surface 45a and the boss 62U, as compared with when the inner peripheral surface 82b is located outside the swage hole 45.

The inner peripheral surface 82b is at least partially located between the seating surface 42b and the center plane Pm (the center between the seating surface 42a the seating surface 42b). Because of this, the boss 62U can contact the inner surface 45a in a larger area, as compared with when the inner peripheral surface 82b is located between the center plane Pm and the seating surface 42a. In this manner, the boss 62U can be more firmly joined to the inner surface 45a.

The length Lu of the boss 62U protruding from the flat surface 71U is set to larger than the half Lh of the distance between the seating surface 42a and the seating surface 42b. Such setting allows the boss 62U to contact the inner surface 45a and the boss 62D in larger areas, than the boss 62U having the length Lu smaller than the half Lh of the distance between the seating surface 42a and the seating surface 42b. As such, the boss 62U can be more firmly joined to the inner surface 45a irrespective of whether the arm 42 has a thinner thickness between the seating surface 42a and the seating surface 42b.

Second Embodiment

A second embodiment will be described below with reference to FIG. 6. Note that in the following descriptions of a plurality of embodiments, component elements having functions similar to those of the component elements having been described are denoted by the same reference numerals as those of the component elements having been descried above, and the description thereof may be omitted. In addition, a plurality of component elements denoted by the same reference numerals does not necessarily have all the functions and properties in common, and may have different functions and properties according to the embodiments.

Figure 6:
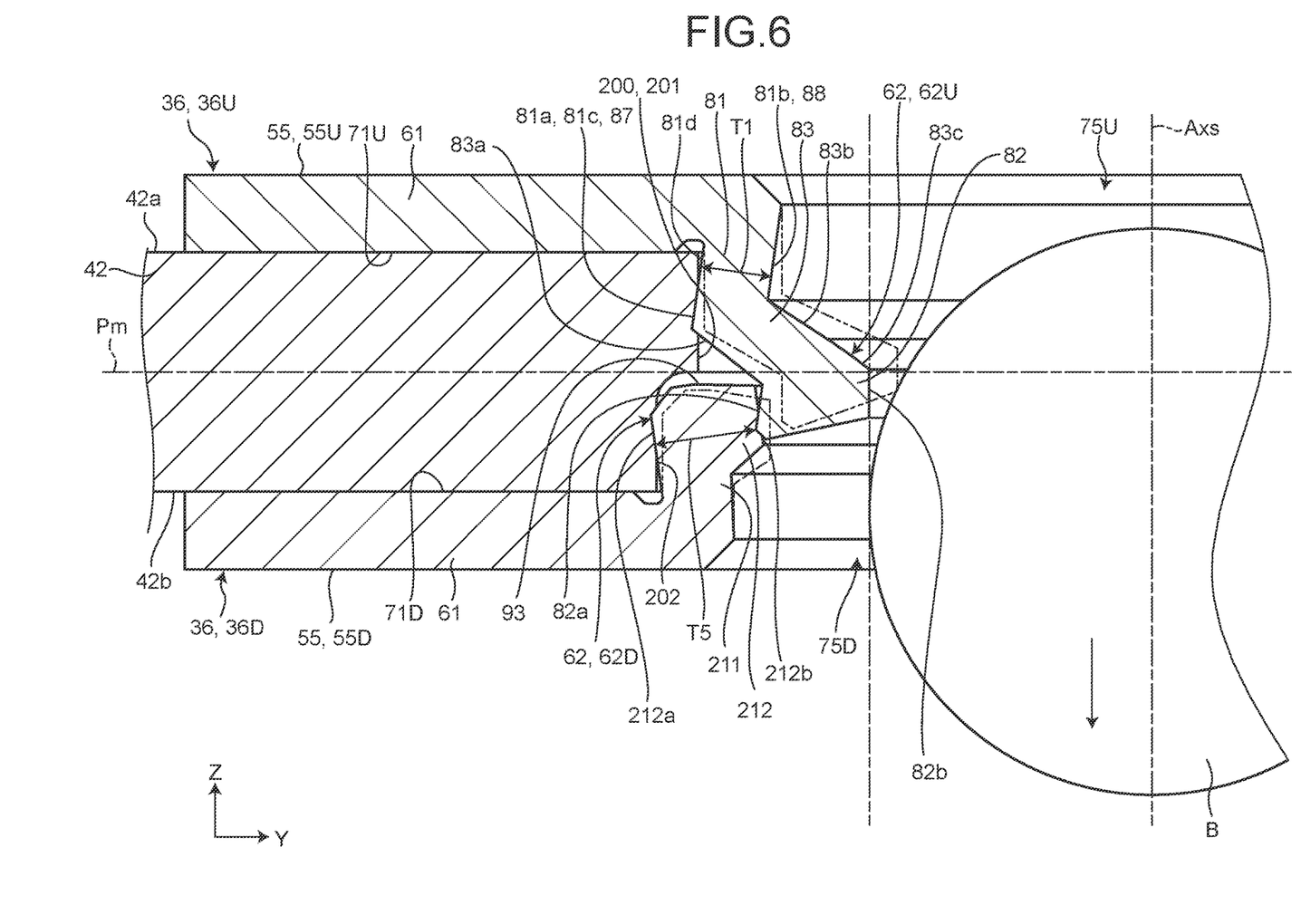
FIG. 6 is an exemplary cross-sectional view partially illustrating an arm and base plates according to a second embodiment.

FIG. 6 is an exemplary cross-sectional view partially illustrating an arm 42 and base plates 55U and 55D according to the second embodiment. As illustrated in FIG. 6, the arm 42 of the second embodiment has an inner surface 200 instead of the inner surface 45a. The inner surface 200 is substantially identical to the inner surface 45a except for the points described below.

The inner surface 200 includes a first inner surface 201 and a second inner surface 202. The first inner surface 201 is closer to the seating surface 42a than the second inner surface 202. In the present embodiment, the first inner surface 201 is a substantially cylindrical curved surface connected to the seating surface 42a and extending from the seating surface 42a substantially in the −Z direction.

The boss 62U is swaged to the first inner surface 201. The outer peripheral surface 81a of the outer annular part 81 is in contact with the first inner surface 201. The outer peripheral surface 81a digs into the first inner surface 201, allowing the contact region 81c of the outer peripheral surface 81a to be joined to the first inner surface 201.

The second inner surface 202 is closer to the seating surface 42b than the first inner surface 201. In the present embodiment, the second inner surface 202 is located between the seating surface 42b and the first inner surface 201. The second inner surface 202 is recessed radially outward from the first inner surface 201. Thus, the second inner surface 202 has a larger diameter than the first inner surface 201. The second inner surface 202 can be formed by, for example, etching.

The boss 62D of the second embodiment includes a smaller-thickness part 211 and a larger-thickness part 212. The smaller-thickness part 211 is a substantially cylindrical part protruding from the flat surface 71D substantially in the +Z direction. The larger-thickness part 212 is a substantially annular part further away from the flat surface 71D than the smaller-thickness part 211. In the present embodiment, the larger-thickness part 212 is connected to an end portion of the smaller-thickness part 211 in the +Z direction.

The larger-thickness part 212 includes an outer peripheral surface 212a and an inner peripheral surface 212b. The outer peripheral surface 212a is a substantially cylindrical curved surface facing radially outward. The inner peripheral surface 212b is opposite the outer peripheral surface 212a. The inner peripheral surface 212b is a substantially cylindrical curved surface facing radially inward. In other words, the inner peripheral surface 212b faces inside the swage hole 45.

The boss 62D is swaged to the second inner surface 202. The outer peripheral surface 212a is in contact with the second inner surface 202. The outer peripheral surface 212a is joined to the second inner surface 202 by digging into the second inner surface 202.

The inner peripheral surface 212b of the boss 62D is in contact with the outer peripheral surface 82a of the inner annular part 82. The larger-thickness part 212 of the boss 62D is held between the second inner surface 202 of the inner surface 200 and the outer peripheral surface 82a of the inner annular part 82.

The larger-thickness part 212 has a thickness T5 larger than the thickness T1 of the outer annular part 81. In other words, the larger-thickness part 212 of the boss 62D is larger in thickness than the outer annular part 81 of the boss 62U. The larger-thickness part 212 is larger in thickness than the smaller-thickness part 211.

For example, the diameter of the inner peripheral surface 212b of the larger-thickness part 212 is substantially equal to the diameter of the inner peripheral surface 81b of the outer annular part 81. However, the diameter of the outer peripheral surface 212a of the larger-thickness part 212 is larger than the diameter of the outer peripheral surface 81a of the outer annular part 81.

In the HDD 10 of the second embodiment described above, the boss 62U includes the outer annular part 81 protruding from the flat surface 71U to contact with the inner surface 200, and the inner annular part 82 being further away from the flat surface 71U than the outer annular part 81. The larger-thickness part 212 of the boss 62D is held between the inner surface 200 and the inner annular part 82 and is larger in thickness than the outer annular part 81. In swaging, a larger-thickness part can be typically joined more firmly than a smaller-thickness part. As such, the boss 62D can be more firmly joined to the inner surface 200.

The inner surface 200 includes the first inner surface 201 and the second inner surface 202. The first inner surface 201 contacts with the outer annular part 81 and the second inner surface 202 is recessed from the first inner surface 201 and contacts with the boss 62D. This configuration makes it possible to easily set a larger thickness to the larger-thickness part 212 of the boss 62D.

Third Embodiment

Figure 7:
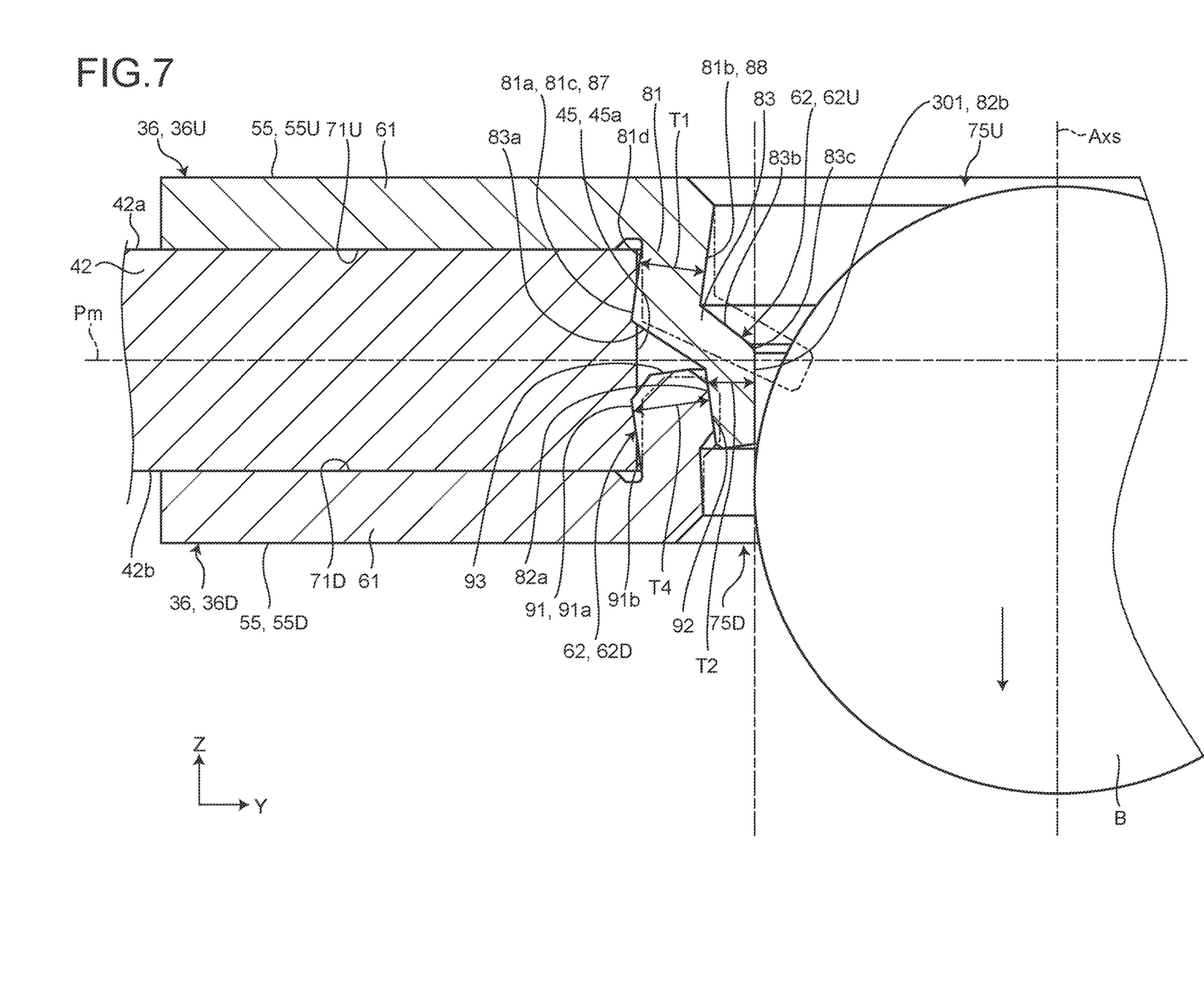
FIG. 7 is an exemplary cross-sectional view partially illustrating an arm and base plates according to a third embodiment.

A third embodiment will be described below with reference to FIG. 7. FIG. 7 is an exemplary cross-sectional view partially illustrating an arm 42 and base plates 55U and 55D according to the third embodiment. As illustrated in FIG. 7, the boss 62U of the third embodiment has an inner annular part 301 instead of the inner annular part 82. The inner annular part 301 is substantially identical to the inner annular part 82 except for the points described below.

The thickness T2 of the inner annular part 301 is equal to or less than the thickness T1 of the outer annular part 81. Furthermore, the thickness T2 of the inner annular part 301 is equal to or less than the thickness T4 of the boss 62D. The thickness T2 of the inner annular part 301 is not limited to this example.

Before swaging, the outer peripheral surface 82a of the inner annular part 301 and the outer inclined surface 83a of the intermediate part 83 are substantially continuous and has an integral, conical shape tapered in the −Z direction. The inner peripheral surface 82b of the inner annular part 301 and the inner inclined surface 83b of the intermediate part 83 are substantially continuous and has an integral, conical shape tapered in the −Z direction.

The ball B enters the insertion hole 750 and presses the inner peripheral surface 82b tapered in the −Z direction substantially in the −Z direction. The boss 62U is plastically deformed so as to expand while being pulled in the −Z direction by the ball B. This allows the outer peripheral surface 81a of the outer annular part 81 to be joined to the inner surface 45a of the swage hole 45 by contact.

Furthermore, due to a relatively thin thickness, the inner annular part 301 is bent relative to the intermediate part 83 by being pushed by the ball B. This allows the outer peripheral surface 82a of the inner annular part 301 to contact with the inner peripheral surface 92 of the boss 62D, to hold the boss 62D between the inner surface 45a and the inner annular part 301. A groove may be provided in-between the inner annular part 301 and the intermediate part 83 to facilitate bending of the inner annular part 301.

Before swaging, the inner peripheral surface 82b of the inner annular part 301 tapers in the −Z direction, so that the ball B's pressing force to the inner peripheral surface 82b includes a radially outward pressing force (component) to the inner peripheral surface 82b. Because of this, both of the bending of the inner annular part 301 and the joining of the outer peripheral surface 81a of the outer annular part 81 to the inner surface 45a can be achieved.

In the HDD 10 of the third embodiment described above, the boss 62U is bent so as to hold the boss 62D between the inner surface 45a and the inner annular part 301. This allows, for example, setting of a larger fit tolerance between the inner annular part 301 and the boss 62D.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk device comprising:
a first magnetic head;
a second magnetic head;
a carriage including an arm and configured to rotate;
a first suspension having a first base plate mounted to the arm, to hold the first magnetic head; and
a second suspension having a second base plate mounted to the arm, to hold the second magnetic head, wherein the arm with a through-hole includes
a first surface to which the through-hole is open,
a second surface being opposite the first surface and to which the through-hole is open, and an inner surface defining the through-hole,
the first base plate includes
- a third surface facing the first surface, and
- a first boss protruding from the third surface to be accommodated in the through-hole in contact with the inner surface, the second base plate includes
- a fourth surface facing the second surface, and
- a second boss protruding from the fourth surface to be accommodated in the through-hole in contact with the inner surface, and the second boss is at least partly held between the inner surface and the first boss.

2. The disk device according to claim 1, wherein
the first boss has an outer side surface facing the inner surface, and
the second boss is at least partly held between the inner surface and the outer side surface.

3. The disk device according to claim 2, wherein
the outer side surface includes
- a first outer side surface contacting with the inner surface, and
- a second outer side surface facing the inner surface further away from the inner surface than the first outer side surface, and the second boss is at least partly held between the inner surface and the second outer side surface.

4. The disk device according to claim 3, wherein
the first boss includes
- a first inner side surface being opposite the first outer side surface,
- a second inner side surface being opposite the second outer side surface, and
- an inclined surface extending between the first inner side surface and the second inner side surface and tapering toward the second inner side surface, the inclined surface includes a curved surface connected to the second inner side surface, and
the third surface and the curved surface make a larger angle as the curved surface is further distant from the third surface.

5. The disk device according to claim 2, wherein
in a direction in which the second boss protrudes from the fourth surface, an end surface of the second boss is apart from the first boss.

6. The disk device according to claim 5, wherein
the outer side surface includes
- a contact region in contact with the inner surface, and
- a separate region located away from the inner surface and between the contact region and the third surface, and a distance between the end surface and the first boss is set to greater than a longest distance between the separate region and the inner surface.

7. The disk device according to claim 1, wherein
the first boss includes
- a first part protruding from the third surface to contact with the inner surface, and
- a second part located further from the third surface than the first part and having a larger thickness than the first part, and the second boss is at least partly held between the inner surface and the second part.

8. The disk device according to claim 7, wherein
the first part is larger in thickness than the second boss.

9. The disk device according to claim 1, wherein
the first boss includes an inner side surface facing inside the through-hole, and
an innermost part of the inner side surface in the through-hole is located between the first surface and the second surface.

10. The disk device according to claim 9, wherein
the innermost part of the inner side surface in the through-hole is at least partially located between the second surface and a center between the first surface and the second surface.

11. The disk device according to claim 1, wherein
the first boss protruding from the third surface has a length larger than a half of a distance between the first surface and the second surface.

12. The disk device according to claim 1, wherein
the first boss includes
- a first part protruding from the third surface to contact with the inner surface, and
- a second part being further away from the third surface than the first part, and the second boss is at least partly held between the inner surface and the second part, and has a larger thickness than the first part.

13. The disk device according to claim 12, wherein
the inner surface includes
- a first inner surface being in contact with the first part, and
- a second inner surface recessed from the first inner surface and contacting with the second boss.

* * * * *